US011948523B1

(12) United States Patent
Telfer et al.

(10) Patent No.: US 11,948,523 B1
(45) Date of Patent: Apr. 2, 2024

(54) DRIVING VOLTAGES FOR ADVANCED COLOR ELECTROPHORETIC DISPLAYS AND DISPLAYS WITH IMPROVED DRIVING VOLTAGES

(71) Applicant: E INK CORPORATION, Billerica, MA (US)

(72) Inventors: Stephen J. Telfer, Arlington, MA (US); Kosta Ladavac, Cambridge, MA (US); Christopher L. Hoogeboom, Burlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/100,848

(22) Filed: Jan. 24, 2023

Related U.S. Application Data

(62) Division of application No. 17/474,375, filed on Sep. 14, 2021, now Pat. No. 11,776,496.

(60) Provisional application No. 63/078,829, filed on Sep. 15, 2020.

(51) Int. Cl.
*G09G 3/34* (2006.01)
*G02F 1/167* (2019.01)

(52) U.S. Cl.
CPC ............ *G09G 3/344* (2013.01); *G02F 1/167* (2013.01)

(58) Field of Classification Search
CPC ...................................................... G09G 3/344
See application file for complete search history.

(56) References Cited

U.S. PATENT DOCUMENTS 4,418,346 A 11/1983 Batchelder
5,852,196 A 12/1998 Hou
5,872,552 A 2/1999 Gordon, II et al.
5,930,026 A 7/1999 Jacobson et al.
6,017,584 A 1/2000 Albert et al.
6,081,285 A 6/2000 Wen et al.
6,130,774 A 10/2000 Albert et al.
6,144,361 A 11/2000 Gordon, II et al.
6,184,856 B1 2/2001 Gordon, II et al.
(Continued)

FOREIGN PATENT DOCUMENTS

CN 102831850 A 12/2012
JP 2010044114 A 2/2010
(Continued)

OTHER PUBLICATIONS

Kitamura, T. et al., "Electrical toner movement for electronic paper-like display", Asia Display/IDW '01, pp. 1517-1520, Paper HCS1-1 (2001).

(Continued)

*Primary Examiner* — Gustavo Polo
(74) *Attorney, Agent, or Firm* — Rajesh Vallabh

(57) ABSTRACT

Improved methods for driving a four particle electrophoretic medium including a scattering particle and at least two subtractive particles. Such methods allow displays such as a color electrophoretic display including a backplane having an array of thin film transistors, wherein each thin film transistor includes a layer of metal oxide semiconductor. The metal oxide transistors allow faster, higher voltage switching, and thus allow direct color switching of a four-particle electrophoretic medium without a need for top plane switching. As a result, the color electrophoretic display can be updated faster and the colors are reproduced more reliably.

8 Claims, 12 Drawing Sheets

(56) References Cited

U.S. PATENT DOCUMENTS

| | | | |
|---|---|---|---|
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,538,801 | B2 | 3/2003 | Jacobson et al. |
| 6,545,797 | B2 | 4/2003 | Chen et al. |
| 6,664,944 | B1 | 12/2003 | Albert et al. |
| 6,672,921 | B1 | 1/2004 | Liang et al. |
| 6,727,873 | B2 | 4/2004 | Gordon, II et al. |
| 6,753,999 | B2 | 6/2004 | Zehner et al. |
| 6,788,449 | B2 | 9/2004 | Liang et al. |
| 6,788,452 | B2 | 9/2004 | Liang et al. |
| 6,822,782 | B2 | 11/2004 | Honeyman et al. |
| 6,825,970 | B2 | 11/2004 | Goenaga et al. |
| 6,866,760 | B2 | 3/2005 | Paolini, Jr. et al. |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,012,735 | B2 | 3/2006 | Honeyman |
| 7,023,420 | B2 | 4/2006 | Comiskey et al. |
| 7,034,783 | B2 | 4/2006 | Gates et al. |
| 7,038,656 | B2 | 5/2006 | Liang et al. |
| 7,038,670 | B2 | 5/2006 | Liang et al. |
| 7,046,228 | B2 | 5/2006 | Liang et al. |
| 7,052,571 | B2 | 5/2006 | Wang et al. |
| 7,061,166 | B2 | 6/2006 | Kuniyasu |
| 7,061,662 | B2 | 6/2006 | Chung et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,144,942 | B2 | 12/2006 | Zang et al. |
| 7,167,155 | B1 | 1/2007 | Albert et al. |
| 7,170,670 | B2 | 1/2007 | Webber |
| 7,176,880 | B2 | 2/2007 | Amundson et al. |
| 7,177,066 | B2 | 2/2007 | Chung et al. |
| 7,193,625 | B2 | 3/2007 | Danner et al. |
| 7,202,847 | B2 | 4/2007 | Gates |
| 7,230,750 | B2 | 6/2007 | Whitesides et al. |
| 7,236,291 | B2 | 6/2007 | Kaga et al. |
| 7,242,514 | B2 | 7/2007 | Chung et al. |
| 7,259,744 | B2 | 8/2007 | Arango et al. |
| 7,283,119 | B2 | 10/2007 | Kishi |
| 7,312,784 | B2 | 12/2007 | Baucom et al. |
| 7,321,459 | B2 | 1/2008 | Masuda et al. |
| 7,327,511 | B2 | 2/2008 | Whitesides et al. |
| 7,339,715 | B2 | 3/2008 | Webber et al. |
| 7,349,147 | B2 | 3/2008 | Chopra et al. |
| 7,397,597 | B2 | 7/2008 | Verschueren et al. |
| 7,408,699 | B2 | 8/2008 | Wang et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,492,339 | B2 | 2/2009 | Amundson |
| 7,499,211 | B2 | 3/2009 | Suwabe et al. |
| 7,528,822 | B2 | 5/2009 | Amundson et al. |
| 7,535,624 | B2 | 5/2009 | Amundson et al. |
| 7,561,324 | B2 | 7/2009 | Duthaler et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,656,576 | B2 | 2/2010 | Suwabe et al. |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,715,088 | B2 | 5/2010 | Liang et al. |
| 7,839,564 | B2 | 11/2010 | Whitesides et al. |
| 7,848,009 | B2 | 12/2010 | Machida et al. |
| 7,859,742 | B1 | 12/2010 | Chiu et al. |
| 7,885,457 | B2 | 2/2011 | Hirano et al. |
| 7,910,175 | B2 | 3/2011 | Webber |
| 7,952,557 | B2 | 5/2011 | Amundson |
| 7,952,790 | B2 | 5/2011 | Honeyman et al. |
| 7,956,841 | B2 | 6/2011 | Albert et al. |
| 7,982,479 | B2 | 7/2011 | Wang et al. |
| 7,982,941 | B2 | 7/2011 | Lin et al. |
| 7,999,787 | B2 | 8/2011 | Amundson et al. |
| 8,009,348 | B2 | 8/2011 | Zehner et al. |
| 8,023,176 | B2 | 9/2011 | Akashi et al. |
| 8,031,392 | B2 | 10/2011 | Hiji et al. |
| 8,040,594 | B2 | 10/2011 | Paolini, Jr. et al. |
| 8,054,526 | B2 | 11/2011 | Bouchard |
| 8,077,141 | B2 | 12/2011 | Duthaler et al. |
| 8,098,418 | B2 | 1/2012 | Paolini, Jr. et al. |
| 8,125,501 | B2 | 2/2012 | Amundson et al. |
| 8,139,050 | B2 | 3/2012 | Jacobson et al. |
| 8,159,636 | B2 | 4/2012 | Sun et al. |
| 8,174,490 | B2 | 5/2012 | Whitesides et al. |
| 8,174,491 | B2 | 5/2012 | Machida et al. |
| 8,243,013 | B1 | 8/2012 | Sprague et al. |
| 8,262,883 | B2 | 9/2012 | Muller et al. |
| 8,274,472 | B1 | 9/2012 | Wang et al. |
| 8,289,250 | B2 | 10/2012 | Zehner et al. |
| 8,300,006 | B2 | 10/2012 | Zhou et al. |
| 8,314,784 | B2 | 11/2012 | Ohkami et al. |
| 8,319,759 | B2 | 11/2012 | Jacobson et al. |
| 8,363,299 | B2 | 1/2013 | Paolini, Jr. et al. |
| 8,373,649 | B2 | 2/2013 | Low et al. |
| 8,384,658 | B2 | 2/2013 | Albert et al. |
| 8,390,918 | B2 | 3/2013 | Wilcox et al. |
| 8,422,116 | B2 | 4/2013 | Sprague et al. |
| 8,432,606 | B2 | 4/2013 | Park et al. |
| 8,456,414 | B2 | 6/2013 | Lin et al. |
| 8,462,102 | B2 | 6/2013 | Wong et al. |
| 8,477,404 | B2 | 7/2013 | Moriyama et al. |
| 8,503,063 | B2 | 8/2013 | Sprague |
| 8,514,168 | B2 | 8/2013 | Chung et al. |
| 8,520,286 | B2 | 8/2013 | Clapp et al. |
| 8,537,105 | B2 | 9/2013 | Chiu et al. |
| 8,542,431 | B2 | 9/2013 | Shuto et al. |
| 8,558,783 | B2 | 10/2013 | Wilcox et al. |
| 8,558,786 | B2 | 10/2013 | Lin |
| 8,558,855 | B2 | 10/2013 | Sprague et al. |
| 8,576,164 | B2 | 11/2013 | Sprague et al. |
| 8,576,259 | B2 | 11/2013 | Lin et al. |
| 8,576,470 | B2 | 11/2013 | Paolini, Jr. et al. |
| 8,576,475 | B2 | 11/2013 | Huang et al. |
| 8,576,476 | B2 | 11/2013 | Telfer et al. |
| 8,582,196 | B2 | 11/2013 | Walls et al. |
| 8,587,859 | B2 | 11/2013 | Kayashima et al. |
| 8,605,032 | B2 | 12/2013 | Liu et al. |
| 8,605,354 | B2 | 12/2013 | Zhang et al. |
| 8,649,084 | B2 | 2/2014 | Wang et al. |
| 8,665,206 | B2 | 3/2014 | Lin et al. |
| 8,670,174 | B2 | 3/2014 | Sprague et al. |
| 8,681,191 | B2 | 3/2014 | Yang et al. |
| 8,704,754 | B2 | 4/2014 | Machida et al. |
| 8,704,756 | B2 | 4/2014 | Lin |
| 8,717,664 | B2 | 5/2014 | Wang et al. |
| 8,730,216 | B2 | 5/2014 | Mizutani et al. |
| 8,786,935 | B2 | 7/2014 | Sprague |
| 8,797,634 | B2 | 8/2014 | Paolini, Jr. et al. |
| 8,810,525 | B2 | 8/2014 | Sprague |
| 8,873,129 | B2 | 10/2014 | Paolini, Jr. et al. |
| 8,896,908 | B2 | 11/2014 | Shuto et al. |
| 8,902,153 | B2 | 12/2014 | Bouchard et al. |
| 8,902,491 | B2 | 12/2014 | Wang et al. |
| 8,917,439 | B2 | 12/2014 | Wang et al. |
| 8,928,562 | B2 | 1/2015 | Gates et al. |
| 8,928,641 | B2 | 1/2015 | Chiu et al. |
| 8,952,885 | B2 | 2/2015 | Suwabe et al. |
| 8,963,147 | B2 | 2/2015 | Imamura et al. |
| 8,963,903 | B2 | 2/2015 | Sakamoto et al. |
| 8,964,282 | B2 | 2/2015 | Wang et al. |
| 8,976,444 | B2 | 3/2015 | Zhang et al. |
| 8,982,447 | B2 | 3/2015 | Shen et al. |

(56) References Cited

U.S. PATENT DOCUMENTS 9,013,394 B2 4/2015 Lin
9,013,516 B2 4/2015 Sakamoto et al.
9,013,783 B2 4/2015 Sprague
9,019,197 B2 4/2015 Lin
9,019,198 B2 4/2015 Lin et al.
9,019,318 B2 4/2015 Sprague et al.
9,082,352 B2 7/2015 Cheng et al.
9,116,412 B2 8/2015 Lin
9,146,439 B2 9/2015 Zhang
9,152,005 B2 10/2015 Morikawa et al.
9,170,468 B2 10/2015 Lin et al.
9,182,646 B2 11/2015 Paolini, Jr. et al.
9,195,111 B2 11/2015 Anseth et al.
9,199,441 B2 12/2015 Danner
9,218,773 B2 12/2015 Sun et al.
9,224,338 B2 12/2015 Chan et al.
9,224,342 B2 12/2015 Sprague et al.
9,224,344 B2 12/2015 Chung et al.
9,230,492 B2 1/2016 Harrington et al.
9,251,736 B2 2/2016 Lin et al.
9,262,973 B2 2/2016 Wu et al.
9,268,191 B2 2/2016 Paolini, Jr. et al.
9,279,906 B2 3/2016 Kang
9,285,649 B2 3/2016 Du et al.
9,299,294 B2 3/2016 Lin et al.
9,348,193 B2 5/2016 Hiji et al.
9,360,733 B2 6/2016 Wang et al.
9,361,836 B1 6/2016 Telfer et al.
9,383,623 B2 7/2016 Lin et al.
9,390,066 B2 7/2016 Smith et al.
9,390,661 B2 7/2016 Chiu et al.
9,423,666 B2 8/2016 Wang et al.
9,429,810 B2 8/2016 Kaino et al.
9,459,510 B2 10/2016 Lin
9,460,666 B2 10/2016 Sprague et al.
9,494,808 B2 11/2016 Farrand et al.
9,495,918 B2 11/2016 Harrington et al.
9,501,981 B2 11/2016 Lin et al.
9,513,527 B2 12/2016 Chan et al.
9,513,743 B2 12/2016 Sjodin et al.
9,514,667 B2 12/2016 Lin
9,541,813 B2 1/2017 Sakamoto et al.
9,541,814 B2 1/2017 Lin et al.
9,612,502 B2 4/2017 Danner et al.
9,620,048 B2 4/2017 Sim et al.
9,671,668 B2 6/2017 Chan et al.
9,672,766 B2 6/2017 Sjodin
9,691,333 B2 6/2017 Cheng et al.
9,697,778 B2 7/2017 Telfer et al.
9,721,495 B2 8/2017 Harrington et al.
9,759,978 B2 9/2017 Liu
9,759,980 B2 9/2017 Du et al.
9,761,180 B2 9/2017 Ogawa
9,792,861 B2 10/2017 Chang et al.
9,792,862 B2 10/2017 Hung et al.
9,812,073 B2 11/2017 Lin et al.
9,868,803 B2 1/2018 Farrand et al.
9,921,451 B2 3/2018 Telfer et al.
10,031,394 B2 7/2018 Nakayama et al.
10,036,929 B2 7/2018 Du et al.
10,037,735 B2 7/2018 Amundson
10,147,366 B2 12/2018 Lin et al.
10,162,242 B2 12/2018 Wang et al.
10,209,556 B2 2/2019 Rosenfeld et al.
10,229,641 B2 3/2019 Yang et al.
10,276,109 B2 4/2019 Crounse et al.
10,319,313 B2 6/2019 Harris et al.
10,339,876 B2 7/2019 Lin et al.
10,353,266 B2 7/2019 Bouchard et al.
10,372,008 B2 8/2019 Telfer et al.
10,444,553 B2 10/2019 Laxton
10,467,984 B2 11/2019 Buckley et al.
10,593,272 B2 3/2020 Telfer et al.
10,672,350 B2 6/2020 Amundson et al.
10,678,111 B2 6/2020 Telfer et al.
10,782,586 B2 9/2020 Liu et al.
10,891,906 B2 1/2021 Lin
11,030,969 B2 6/2021 Sainis et al.
11,124,136 B2 9/2021 Kamini et al.
11,500,261 B2 11/2022 Wu et al.
2003/0102858 A1 6/2003 Jacobson et al.
2004/0246562 A1 12/2004 Chung et al.
2005/0253777 A1 11/2005 Zehner et al.
2007/0103427 A1 5/2007 Zhou et al.
2007/0176912 A1 8/2007 Beames et al.
2008/0024429 A1 1/2008 Zehner
2008/0024482 A1 1/2008 Gates et al.
2008/0043318 A1 2/2008 Whitesides et al.
2008/0062159 A1 3/2008 Roh et al.
2008/0136774 A1 6/2008 Harris et al.
2008/0303780 A1 12/2008 Sprague et al.
2009/0009852 A1 1/2009 Honeyman et al.
2009/0122389 A1 5/2009 Whitesides et al.
2010/0006441 A1 1/2010 Renaud et al.
2010/0060628 A1 3/2010 Lenssen et al.
2010/0156780 A1 6/2010 Jacobson et al.
2010/0194733 A1 8/2010 Lin et al.
2010/0194789 A1 8/2010 Lin et al.
2010/0220121 A1 9/2010 Zehner et al.
2010/0265561 A1 10/2010 Gates et al.
2011/0043543 A1 2/2011 Chen et al.
2011/0063314 A1 3/2011 Chiu et al.
2011/0175875 A1 7/2011 Lin et al.
2011/0175939 A1 7/2011 Moriyama et al.
2011/0221740 A1 9/2011 Yang et al.
2012/0001957 A1 1/2012 Liu et al.
2012/0098740 A1 4/2012 Chiu et al.
2012/0307343 A1 12/2012 Lai et al.
2013/0063333 A1 3/2013 Arango et al.
2013/0222884 A1 8/2013 Moriyama et al.
2013/0222886 A1 8/2013 Kawahara et al.
2013/0222888 A1 8/2013 Urano et al.
2013/0249782 A1 9/2013 Wu et al.
2013/0250398 A1 9/2013 Takanashi et al.
2014/0009818 A1 1/2014 Brochon et al.
2014/0011913 A1 1/2014 Du et al.
2014/0055840 A1 2/2014 Zang et al.
2014/0078576 A1 3/2014 Sprague
2014/0204012 A1 7/2014 Wu et al.
2014/0240210 A1 8/2014 Wu et al.
2014/0253425 A1 9/2014 Zalesky et al.
2014/0293398 A1 10/2014 Wang et al.
2014/0362213 A1 12/2014 Tseng
2015/0005720 A1 1/2015 Zang et al.
2015/0262255 A1 9/2015 Khajehnouri et al.
2015/0268531 A1 9/2015 Wang et al.
2015/0301246 A1 10/2015 Zang et al.
2016/0012710 A1 1/2016 Lu et al.
2016/0180777 A1 6/2016 Lin et al.
2018/0053472 A1* 2/2018 Lin ...................... G02F 1/1685
2020/0348576 A1 11/2020 Visani et al.

FOREIGN PATENT DOCUMENTS

JP 2013250325 A 12/2013
KR 20070071037 A 7/2007
KR 20070074967 A 7/2007
KR 20130076200 A 7/2013

OTHER PUBLICATIONS

Yamaguchi, Y. et al., "Toner display using insulative particles charged triboelectrically", Asia Display/IDW '01, pp. 1729-1730, Paper AMD4-4 (2001).
Heikenfeld, J. et al., "A critical review of the present and future prospects for electronic paper", SID, 19(2), pp. 129-156 (2011).
Korea Intellectual Property Office, "International Search Report & Written Opinion", PCT/US2021/050201, dated Dec. 24, 2021.

* cited by examiner

| White | Yellow | Magenta | | Cyan | | | |
|---|---|---|---|---|---|---|---|
| White | White | White | White | White | White | White | |
| Cyan | Yellow | Magenta | Magenta | Magenta | Cyan | Yellow | |
| Magenta | | | Cyan | | Magenta | Cyan | |
| Yellow | | | | Yellow | | Yellow | |

| White | Yellow | Red | Magenta | Blue | Cyan | Green | Black |
| [A] | [B] | [C] | [D] | [E] | [F] | [G] | [H] |

DRIVING VOLTAGES FOR ADVANCED COLOR ELECTROPHORETIC DISPLAYS AND DISPLAYS WITH IMPROVED DRIVING VOLTAGES

RELATED APPLICATIONS

This application is a divisional of U.S. patent application Ser. No. 17/474,375 filed on Sep. 14, 2021 entitled DRIVING VOLTAGES FOR ADVANCED COLOR ELECTROPHORETIC DISPLAYS AND DISPLAYS WITH IMPROVED DRIVING VOLTAGES, which claims priority to U.S. Provisional Patent Application No. 63/078,829 filed Sep. 15, 2020 entitled DRIVING VOLTAGES FOR ADVANCED COLOR ELECTROPHORETIC DISPLAYS AND DISPLAYS WITH IMPROVED DRIVING VOLTAGES. All patents and publications disclosed herein are incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also included four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, and 10,593,272.

This invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances two of the particles will be positively-charged, and two particles will be negatively-charged. In some instances, one positively-charged particle will have a thick polymer shell and one negatively-charged particle has a thick polymer shell.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, LDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088:

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197, 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/

0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. Nos. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similarmode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below.

SUMMARY

Disclosed herein are improved methods of driving full color electrophoretic displays and full color electrophoretic displays using these drive methods. In one aspect, the invention involves a color electrophoretic display including a light-transmissive electrode at a viewing surface, a backplane including an array of thin film transistors coupled to pixel electrodes, wherein each thin film transistor comprising a layer of a metal oxide semiconductor, and a color electrophoretic medium disposed between the light-transmissive electrode and the backplane. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles.

In some embodiments, a first electric field required to separate an aggregate formed by the third and the fourth types of particles is greater than a second electric field required to separate an aggregate formed from any other two types of particles. In some embodiments, at least two of the second, third and fourth particles are non-light-scattering. In some embodiments, the first particles are white and the second, third and fourth particles are non-light-scattering. In some embodiments, the first and third particles are negatively charged and the second and fourth particles are positively charged. In some embodiments, the first, second, third and fourth particles are respectively white, cyan, yellow and magenta in color, with the white and yellow particles being negatively charged and the magenta and cyan particles positively charged. In some embodiments, the yellow, magenta and cyan pigments exhibit diffuse reflectances at 650, 550 and 450 nm, respectively, measured over a black background, of less than 2.5% when the pigment is approximately isotropically distributed at 15% by volume in a layer of thickness 1 μm comprising the pigment and a liquid of refractive index less than 1.55. In some embodiments, the liquid is a non-polar liquid having a dielectric constant less than about 5. In some embodiments, the fluid has have dissolved or dispersed therein a polymer having a number average molecular weight in excess of about 20,000 and being essentially non-absorbing on the particles. In some embodiments, the metal oxide semiconductor is indium gallium zinc oxide (IGZO). The inventions above may be incorporated into an electronic book reader, portable computer, tablet computer, cellular telephone, smart card, sign, watch, shelf label or flash drive.

In another aspect, a color electrophoretic display including a controller, a light-transmissive electrode at a viewing surface, and a backplane including an array of thin film transistors coupled to pixel electrodes, each thin film transistor comprising a layer of a metal oxide semiconductor. A color electrophoretic medium is disposed between the light-transmissive electrode and the backplane, and the color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles. The controller is configured to provide a plurality of driving voltages to the pixel electrodes such that white, yellow, red, magenta, blue, cyan, green, and black can be displayed at each pixel electrode while keeping the light-transmissive electrode at a constant voltage. In some embodiments, the controller is configured to provide a voltage of greater than 25 Volts and less than −25 Volts to the pixel electrodes. In some embodiments, the controller is configured to additionally provide a voltage between 25 V and 0V and a voltage between −25V and 0V. In some embodiments, the metal oxide semiconductor is indium gallium zinc oxide (IGZO).

In another aspect, a color electrophoretic display including a controller, a light-transmissive electrode at a viewing surface, a backplane electrode, and a color electrophoretic medium disposed between the light-transmissive electrode and the backplane electrode. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors, and (c) a plurality of third and a plurality of fourth particles dispersed in the fluid, the third and fourth particles bearing charges of opposite polarity, the third and fourth particles each having a subtractive primary color different from each other and from the second particles. The controller is configured to provide a first high voltage and a first low voltage to the light transmissive electrode, and a second high voltage, a zero voltage, and a second low voltage to the backplane electrode, such that the colors white, yellow, red, magenta, blue, cyan, green, and black can be displayed at the viewing surface, wherein the magnitude of at least one of the first high voltage, the first low voltage, the second high voltage, and the second low voltage are not the same. In some embodiments, the magnitude of the first high voltage and the magnitude of the second high voltage are the same. In some embodiments, the magnitude of the first low voltage and the magnitude of the second low voltage are the same, and the magnitude of the first high voltage and the magnitude of the first low voltage are not the same.

In another aspect, a color electrophoretic display including a controller; a light-transmissive electrode at a viewing surface, a backplane electrode, and a color electrophoretic medium disposed between the light-transmissive electrode and the backplane electrode. The color electrophoretic medium includes (a) a fluid, (b) a plurality of first and a plurality of second particles dispersed in the fluid, the first and second particles bearing charges of opposite polarity, the first particle being a light-scattering particle and the second particle having one of the subtractive primary colors; and (c) a plurality of third and a plurality of fourth particles dispersed in the fluid, the third and fourth particles bearing charges of opposite polarity, the third and fourth particles each having a subtractive primary color different from each other and from the second particles. The controller is configured to cause the colors white, yellow, red, magenta, blue, cyan, green, and black color to be displayed at the viewing surface by providing one of a plurality of time dependent drive voltages to the backplane electrode while providing one of the following drive voltage to the light-transmissive electrode 1) a high voltage for time a first time, a low voltage for a second time, and a high voltage for a third time, or 2) a low voltage for time a first time, a high voltage for a second time, and a low voltage for a third time.

DETAILED DESCRIPTION

The invention includes improved methods for driving a four-particle electrophoretic medium wherein at least two of the particles are colored and subtractive and at least one of the particles is scattering. Typically, such a system includes a white particle and cyan, yellow, and magenta subtractive primary colored particles. Such a system is shown schematically in FIG. 1, and it can provide white, yellow, red, magenta, blue, cyan, green, and black at every pixel.

In the instance of ACeP, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). It has been found that waveforms to sort the four pigments into appropriate configurations to make these colors need at least five voltage levels (high positive, low positive, zero, low negative, high negative). See FIG. 1. To achieve the wider range of colors, additional voltage levels must be used for finer control of the pigments. The invention provides several improved ways to drive such an electrophoretic medium so that they refreshes of pixel colors are faster, less flashy, and result in a color spectrum that is more pleasing to the viewer.

The three particles providing the three subtractive primary colors may be substantially non-light-scattering ("SNLS"). The use of SNLS particles allows mixing of colors and provides for more color outcomes than can be achieved with the same number of scattering particles. These thresholds must be sufficiently separated for avoidance of cross-talk, and this separation necessitates the use of high addressing voltages for some colors. In addition, addressing the colored particle with the highest threshold also moves all the other colored particles, and these other particles must subsequently be switched to their desired positions at lower voltages. Such a step-wise color-addressing scheme produces flashing of unwanted colors and a long transition time. The present invention does not require the use of a such a stepwise waveform and addressing to all colors can, as described below, be achieved with only two positive and two negative voltages (i.e., only five different voltages, two positive, two negative and zero are required in a display, although as described below in certain embodiments it may be preferred to use more different voltages to address the display).

Figure 1:
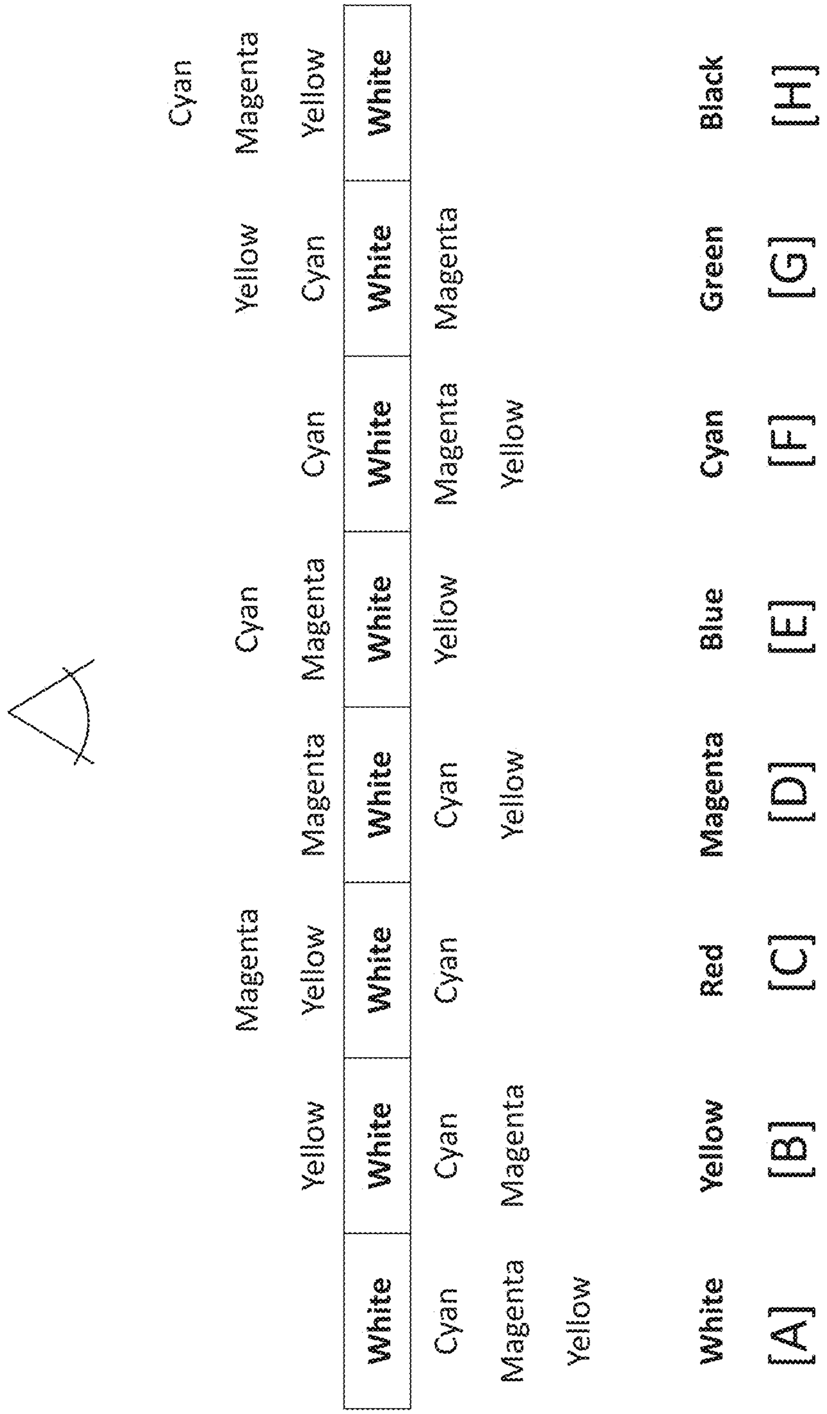
FIG. 1 is a schematic cross-section showing the positions of the various colored particles in an electrophoretic medium of the present invention when displaying black, white, the three subtractive primary and the three additive primary colors.

As already mentioned, FIG. 1 of the accompanying drawings is a schematic cross-section showing the positions of the various particles in an electrophoretic medium of the present invention when displaying black, white, the three subtractive primary and the three additive primary colors. In FIG. 1, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 1 this particle is assumed to be the white pigment. This light-scattering white particle forms a white reflector against which any particles above the white particles (as illustrated in FIG. 1) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 1), there are no particles above the white particles and the pixel simply displays a white color. When a single particle is above the white particles, the color of that single particle is displayed, yellow, magenta and cyan in Situations [B], [D] and [F] respectively in FIG. 1. When two particles lie above the white particles, the color displayed is a combination of those of these two particles; in FIG. 1, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 1), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

It would not be easy to render the color black if more than one type of colored particle scattered light.

FIG. 1 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 1.)

Figure 2A:
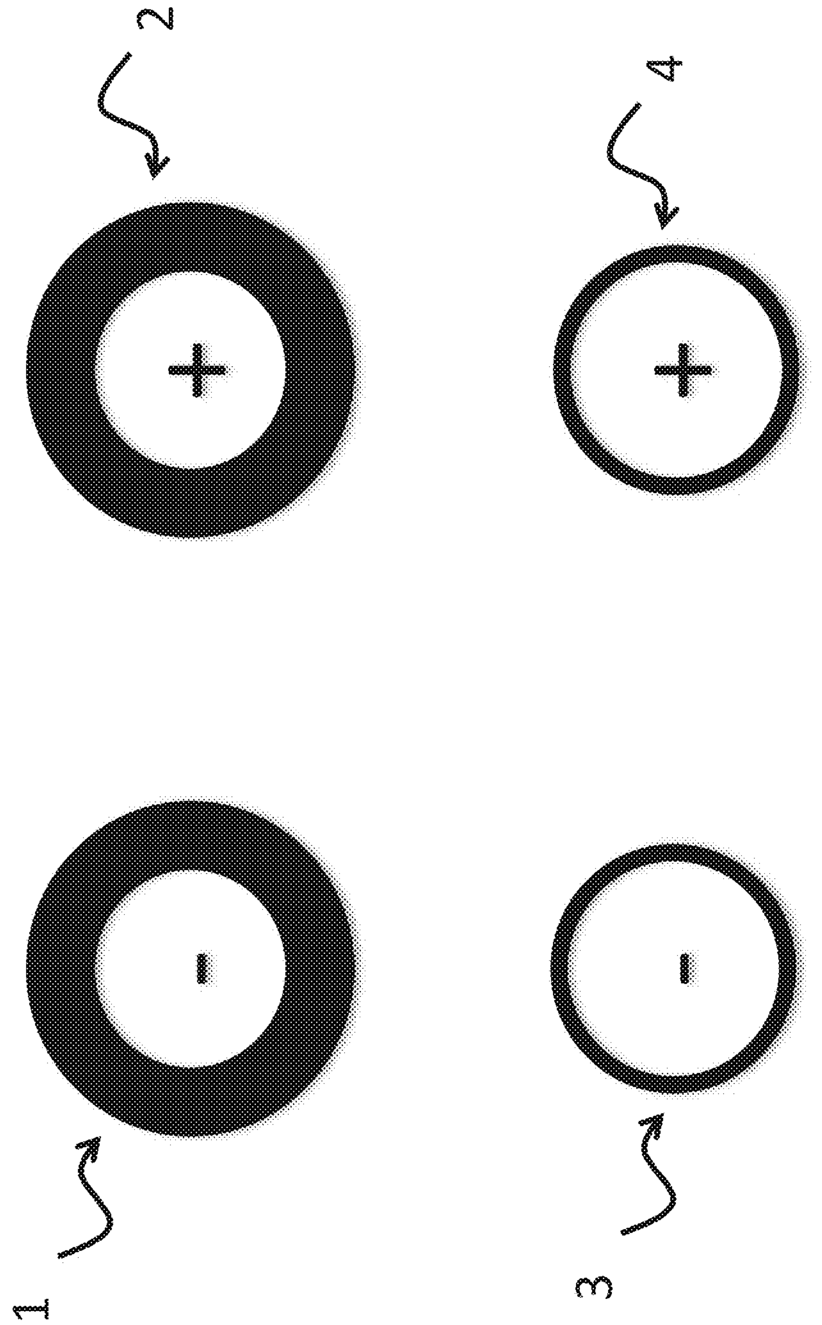
FIG. 2A shows in schematic form four types of different pigment particles used in a multi-particle electrophoretic medium.
Figure 2B:
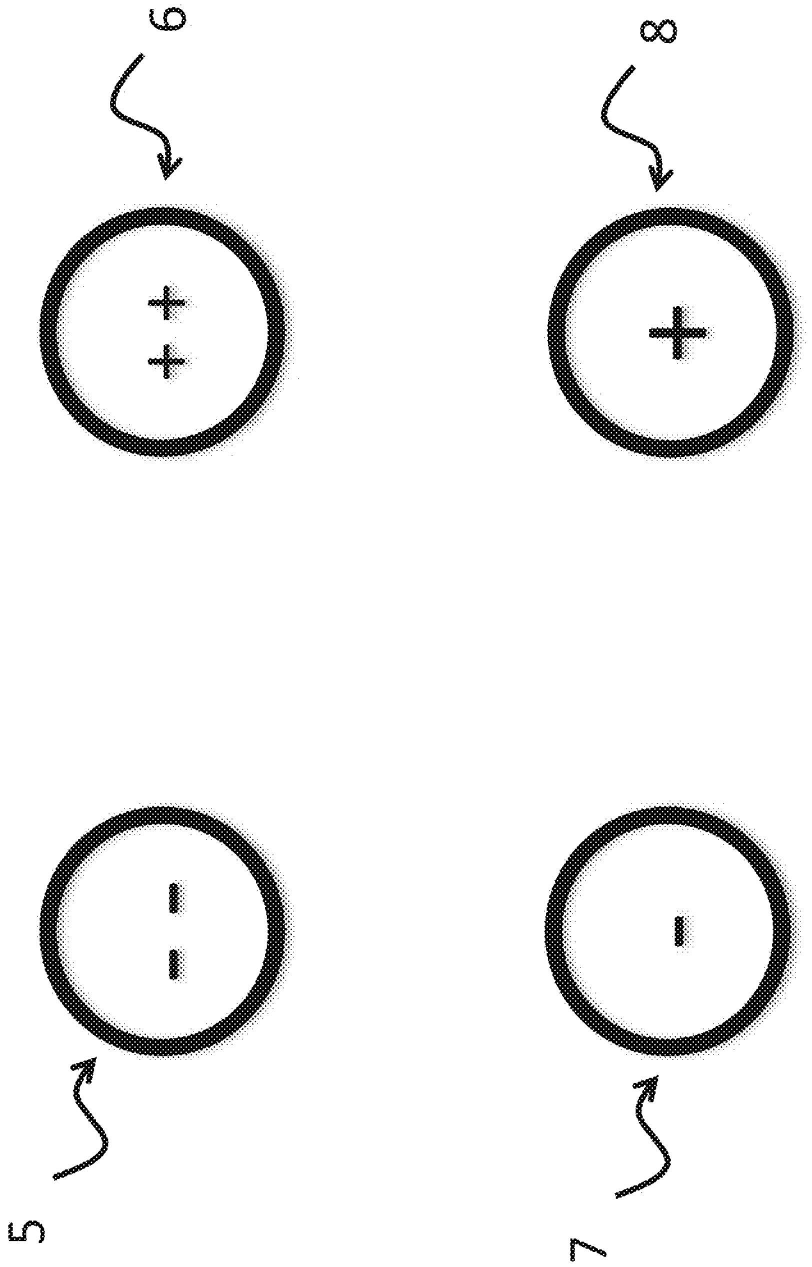
FIG. 2B shows in schematic form four types of different pigment particles used in a multi-particle electrophoretic medium.

FIGS. 2A and 2B show schematic cross-sectional representations of the four pigment types (1-4; 5-8) used in preferred embodiments of the invention. In FIG. 2A, the polymer shell adsorbed to the core pigment is indicated by the dark shading, while the core pigment itself is shown as unshaded. A wide variety of forms may be used for the core pigment: spherical, acicular or otherwise anisometric, aggregates of smaller particles (i.e., "grape clusters"), composite particles comprising small pigment particles or dyes dispersed in a binder, and so on as is well known in the art. The polymer shell may be a covalently-bonded polymer made by grafting processes or chemisorption as is well known in the art, or may be physisorbed onto the particle surface. For example, the polymer may be a block copolymer comprising insoluble and soluble segments. Some methods for affixing the polymer shell to the core pigments are described in the Examples below.

In the embodiment of FIG. 2A, first and second particle types preferably have a more substantial polymer shell than third and fourth particle types. The light-scattering white particle is of the first or second type (either negatively or positively charged). In the discussion that follows it is assumed that the white particle bears a negative charge (i.e., is of Type 1), but it will be clear to those skilled in the art that the general principles described will apply to a set of particles in which the white particles are positively charged.

Additionally, as depicted in FIG. 2B, it is not required that the first and second particle types have differential polymer shells as compared to the third and fourth particle types. As shown in FIG. 2B, sufficient differential charge on the four particles will allow for electrophoretic control of the particles and creation of the desired color at the viewing surface. For example, particle 5 may have a negative charge of greater magnitude than particle 7, while particle 6 has a greater magnitude positive charge as compared to particle 8. It is also possible that other combinations of polymer functionality and charge (or particle size) can be used; however, it must be the case that all four particles can be separated from each other in the presence of suitable electric fields, e.g., lower voltage electric fields that can be produced with commercial digital electronics.

In a system of FIG. 2A, the present invention the electric field required to separate an aggregate formed from mixtures of particles of types 3 and 4 in the suspending solvent containing a charge control agent is greater than that required to separate aggregates formed from any other combination of two types of particle. The electric field required to separate aggregates formed between the first and second types of particle is, on the other hand, less than that required to separate aggregates formed between the first and fourth particles or the second and third particles (and of course less than that required to separate the third and fourth particles).

In FIG. 2A the core pigments comprising the particles are shown as having approximately the same size, and the zeta potential of each particle, although not shown, is assumed to be approximately the same. What varies is the thickness of the polymer shell surrounding each core pigment. As shown in FIG. 2A, this polymer shell is thicker for particles of types 1 and 2 than for particles of types 3 and 4.

To obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3:
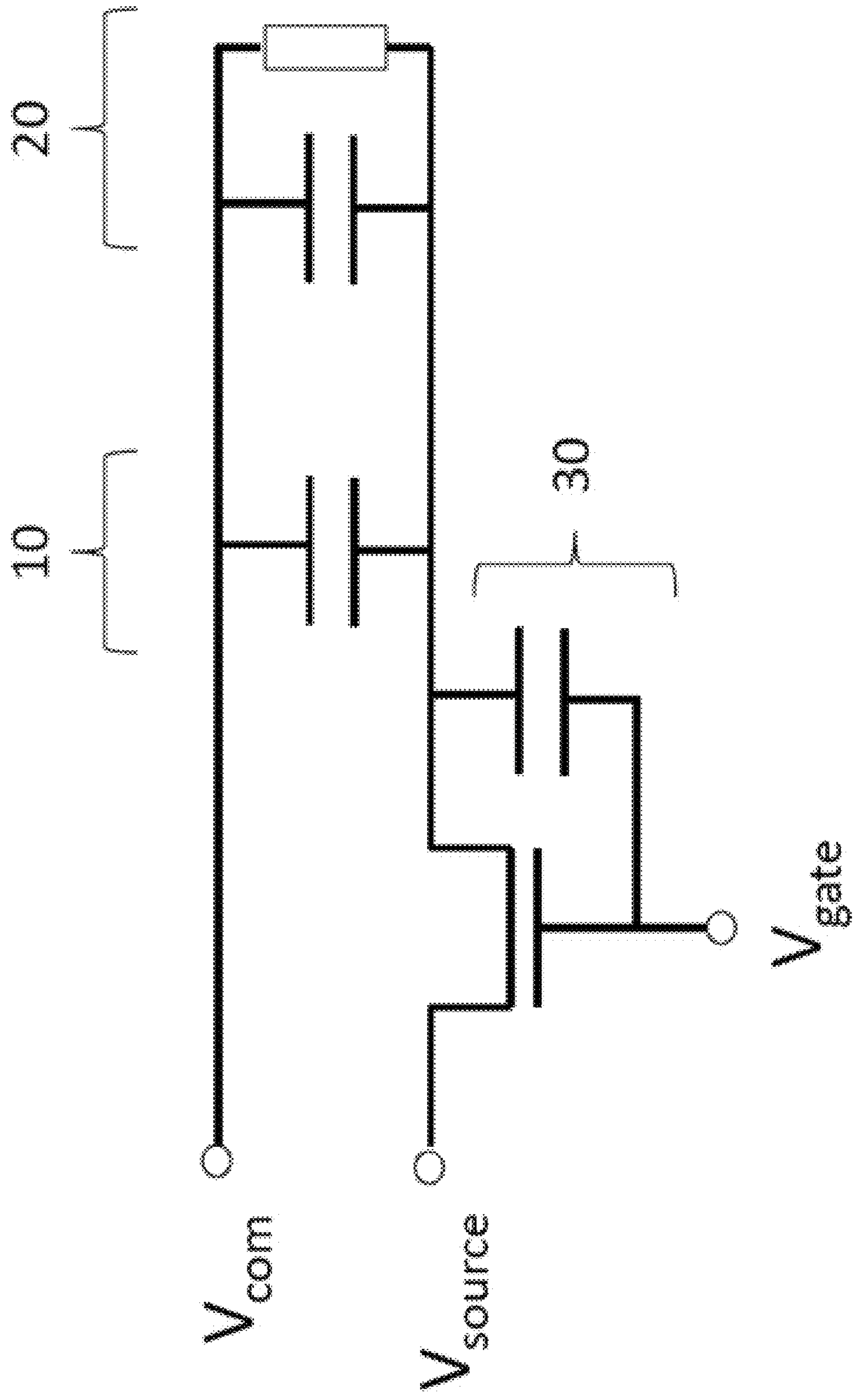
FIG. 3 illustrates an exemplary equivalent circuit of a single pixel of an electrophoretic display.

FIG. 3 of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential Vcon, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.

Problems may arise, however, when $V_{com}$ is set to a voltage that is not compensated for the kickback voltage. This may occur when it is desired to apply a higher voltage to the display than is available from the backplane alone. It is well known in the art that, for example, the maximum voltage applied to the display may be doubled if the backplane is supplied with a choice of a nominal +V, 0, or −V, for example, while $V_{com}$ is supplied with −V. The maximum voltage experienced in this case is +2V (i.e., at the backplane relative to the top plane), while the minimum is zero. If negative voltages are needed, the $V_{com}$ potential must be raised at least to zero. Waveforms used to address a display with positive and negative voltages using top plane switching must therefore have particular frames allocated to each of more than one $V_{com}$ voltage setting.

A set of waveforms for driving a color electrophoretic display having four particles described in U.S. Pat. No. 9,921,451, incorporated by reference herein. In U.S. Pat. No. 9,921,451, seven different voltages are applied to the pixel electrodes: three positive, three negative, and zero. However, in some embodiments, the maximum voltages used in these waveforms are higher than that can be handled by amorphous silicon thin-film transistors. In such instances, suitable high voltages can be obtained by the use of top plane switching. When (as described above) $V_{com}$ is deliberately set to $V_{KB}$, a separate power supply may be used. It is costly and inconvenient, however, to use as many separate power supplies as there are $V_{com}$ settings when top plane switching is used. Furthermore, top plane switching is known to increase kickback, thereby degrading the stability of the color states.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 4:
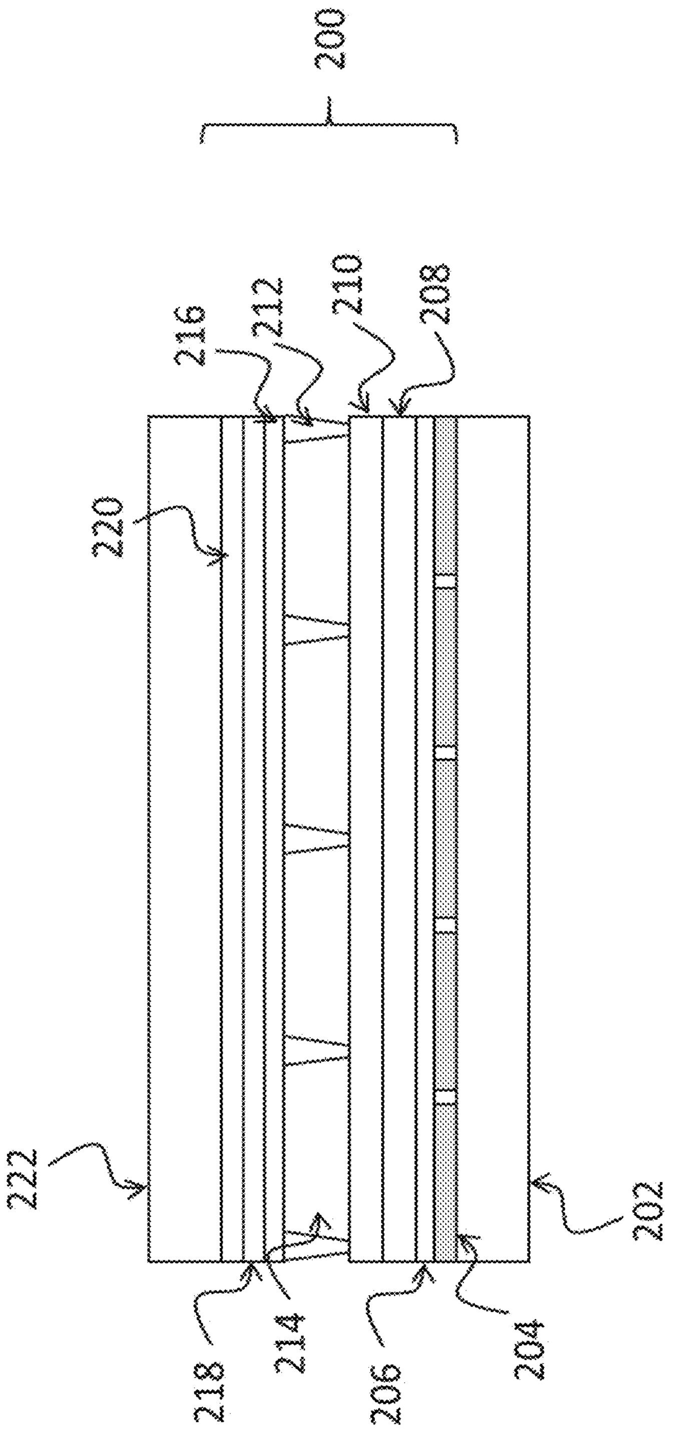
FIG. 4 shows the layers of an exemplary electrophoretic color display.

FIG. 4 shows a schematic, cross-sectional drawing (not to scale) of a display structure 200 suitable for use with the invention. In display 200 the electrophoretic fluid is illustrated as being confined to microcups, although equivalent structures incorporating microcapsules may also be used. Substrate 202, which may be glass or plastic, bears pixel electrodes 204 that are either individually addressed segments or associated with thin film transistors in an active matrix arrangement. (The combination of substrate 202 and electrodes 204 is conventionally referred to as the back plane of the display.) Layer 206 is an optional dielectric layer according to the invention applied to the backplane.

(Methods for depositing a suitable dielectric layer are described in U.S. patent application Ser. No. 16/862,750, incorporated by reference.) The front plane of the display comprises transparent substrate 222 that bears a transparent, electrically conductive coating 220. Overlying electrode layer 220 is an optional dielectric layer 218. Layer (or layers) 216 are polymeric layer(s) that may comprise a primer layer for adhesion of microcups to transparent electrode layer 220 and some residual polymer comprising the bottom of the microcups. The walls of the microcups 212 are used to contain the electrophoretic fluid 214. The microcups are sealed with layer 210 and the whole front plane structure is adhered to the backplane using electrically-conductive adhesive layer 208. Processes for forming the microcups are described in the prior ar, e.g., in U.S. Pat. No. 6,930,818. In some instance, the microcups are less than 20 μm in depth, e.g., less than 15 μm in depth, e.g., less than 12 μm in depth, e.g., about 10 μm in depth, e.g., about 8 μm in depth.

Most commercial electrophoretic displays use amorphous silicon based thin-film transistors (TFTs) in the construction of active matrix backplanes (202/024) because of the wider availability of fabrication facilities and the costs of the various starting materials. Unfortunately, amorphous silicon thin-film transistors become unstable when supplied gate voltages that would allow switching of voltages higher than about +/−15V. Nonetheless, as described below, the performance of ACeP is improved when the magnitudes of the high positive and negative voltages are allowed to exceed +/−15V. Accordingly, as described in previous disclosures, improved performance is achieved by additionally changing the bias of the top light-transmissive electrode with respect to the bias on the backplane pixel electrodes, also known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451.

There are several disadvantages to the top-plane switching approach. Firstly, when (as is typical) the top plane is not pixelated, but is a single electrode extending over the whole surface of the display, its electrical potential affects every pixel in the display. If it is set to match one of the voltages of the largest magnitude available from the backplane (for example, the largest positive voltage) when this voltage is asserted on the backplane there will be no net voltage across the ink. When any other available voltage is supplied to a backplane, there will always be a voltage of negative polarity supplied to any pixel in the display. Thus, if a waveform requires a positive voltage this cannot be supplied to any pixel until the top plane voltage is changed. A typical waveform for use in a multicolor display of the third embodiment uses multiple pulses of both positive and negative polarity, and the lengths of these pulses are not of the same length in waveforms used for making different colors. In addition, the phase of the waveform may be different for different colors: in other words, a positive pulse may precede a negative pulse for some colors, whereas a negative pulse may precede a positive pulse for others. To accommodate such cases, "rests" (i.e., pauses) must be built into the waveforms. In practice, this results in waveforms being much longer (by as much as a factor of two) than they ideally need to be.

Secondly, in top plane switching there are limits to the voltage levels that may be chosen. If the voltages applied to the top plane are denoted $V_{t+}$ and $V_{b-}$, respectively, and those applied to the back plane $V_{b+}$ and $V_{b-}$, respectively, in order to achieve a zero volt condition across the electrophoretic fluid it must be true that $|V_{t+}|=|V_{b+}|$ and $|V_{t-}|=|V_{b-}|$. However, it is not necessary for the magnitudes of the positive and negative voltages to be the same.

In prior embodiments of the Advanced Color electronic Paper (ACeP), the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below.

These waveforms require that each pixel of the display can be driven at five different addressing voltages, designated $+V_{high}$, $+V_{low}$, 0, $-V_{low}$, and $-V_{high}$, illustrated as 30V, 15V, 0, −15V and −30V. In practice, it may be preferred to use a larger number of addressing voltages. If only three voltages are available (i.e., $+V_{high}$, 0, and $-V_{high}$) it may be possible to achieve the same result as addressing at a lower voltage (say, $V_{high}/n$ where n is a positive integer>1) by addressing with pulses of voltage $V_{high}$ but with a duty cycle of 1/n.

Figure 5:
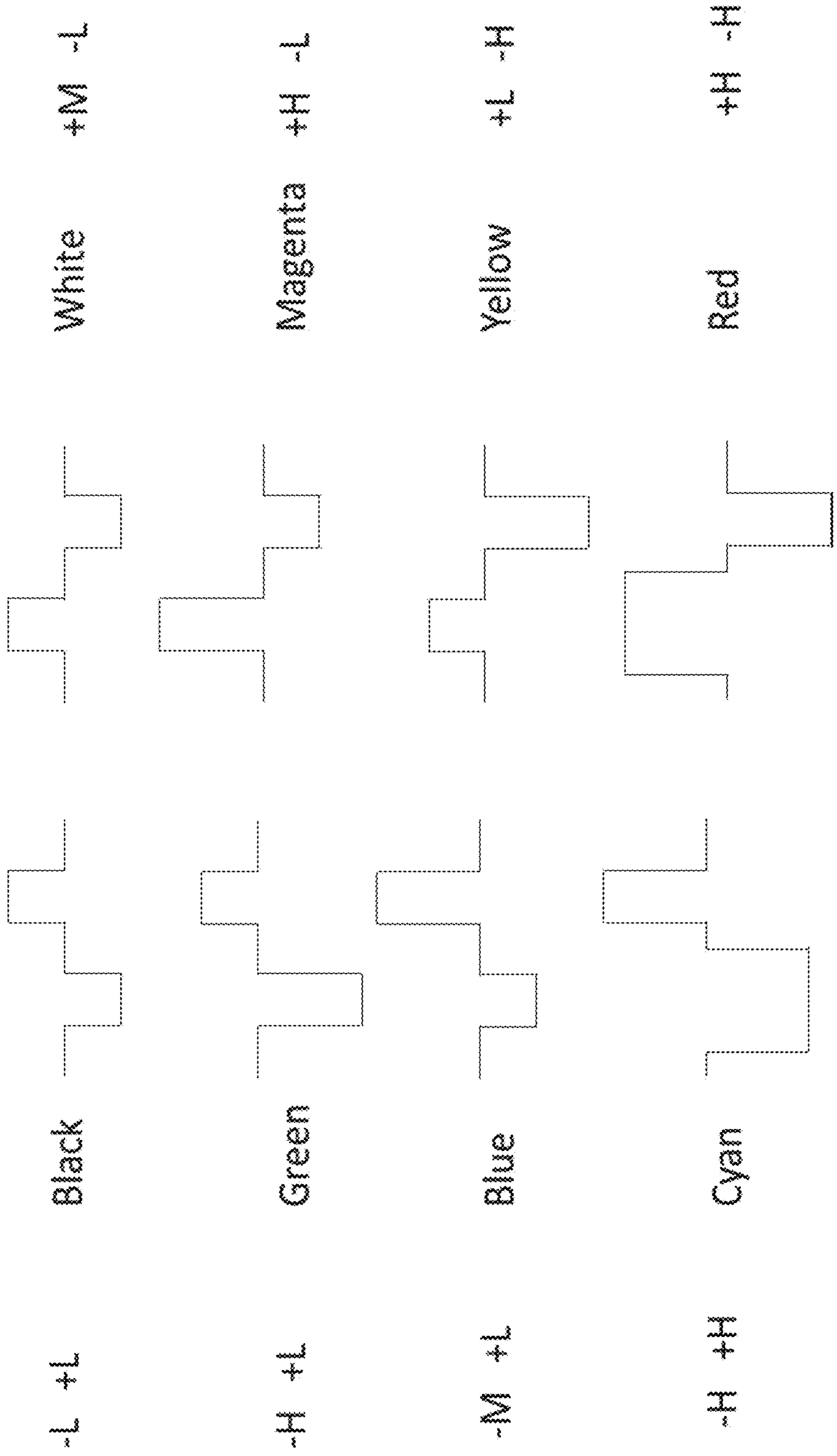
FIG. 5 shows exemplary push-pull drive schemes for addressing an electrophoretic medium including three subtractive particles and a scattering (white) particle.

FIG. 5 shows typical waveforms (in simplified form) used to drive a four-particle color electrophoretic display system described above. Such waveforms have a "push-pull" structure: i.e., they consist of a dipole comprising two pulses of opposite polarity. The magnitudes and lengths of these pulses determine the color obtained. At a minimum, there should be five such voltage levels. FIG. 5 shows high and low positive and negative voltages, as well as zero volts. Typically, "low" (L) refers to a range of about five—15V, while "high" (H) refers to a range of about 15-30V. In general, the higher the magnitude of the "high" voltages, the better the color gamut achieved by the display. The "medium" (M) level is typically around 15V; however, the value for M will depend somewhat on the composition of the particles, as well as the environment of the electrophoretic medium.

Although FIG. 5 shows the simplest dipoles required to form colors, it will be appreciated that practical waveforms may multiple repetitions of these patterns, or other patterns that are aperiodic and use more than five voltage levels.

Thus, the generic driving voltage require that the driving electronics provide as many as seven different voltages to the data lines during the update of a selected pixel of the display (+H, +M, +L, 0, −L, −M, −H). While multi-level source drivers capable of delivering seven different voltages are available, most commercially-available source drivers for electrophoretic displays permit only three different voltages to be delivered during a single frame (typically a positive voltage, zero, and a negative voltage). Accordingly, as discussed previously, it is necessary to modify the generic waveforms of FIG. 5 to accommodate a three level source driver architecture provided that the three voltages supplied to the backplane (typically +V, 0 and −V) can be changed from one frame to the next. The remaining voltage levels can be achieved by using a "top plane switching" drive scheme, wherein the light transmissive (top-plane) common electrode is switched between −V, 0 and +V, while the voltages applied to the pixel electrodes can also vary from −V, 0 to +V with pixel transitions in one direction being handled when the common electrode is at 0 and transitions in the other direction being handled when the common electrode is at +V.

Of course, achieving the desired color with the driving pulses of FIG. 5 is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in greater detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color.

Figure 6:
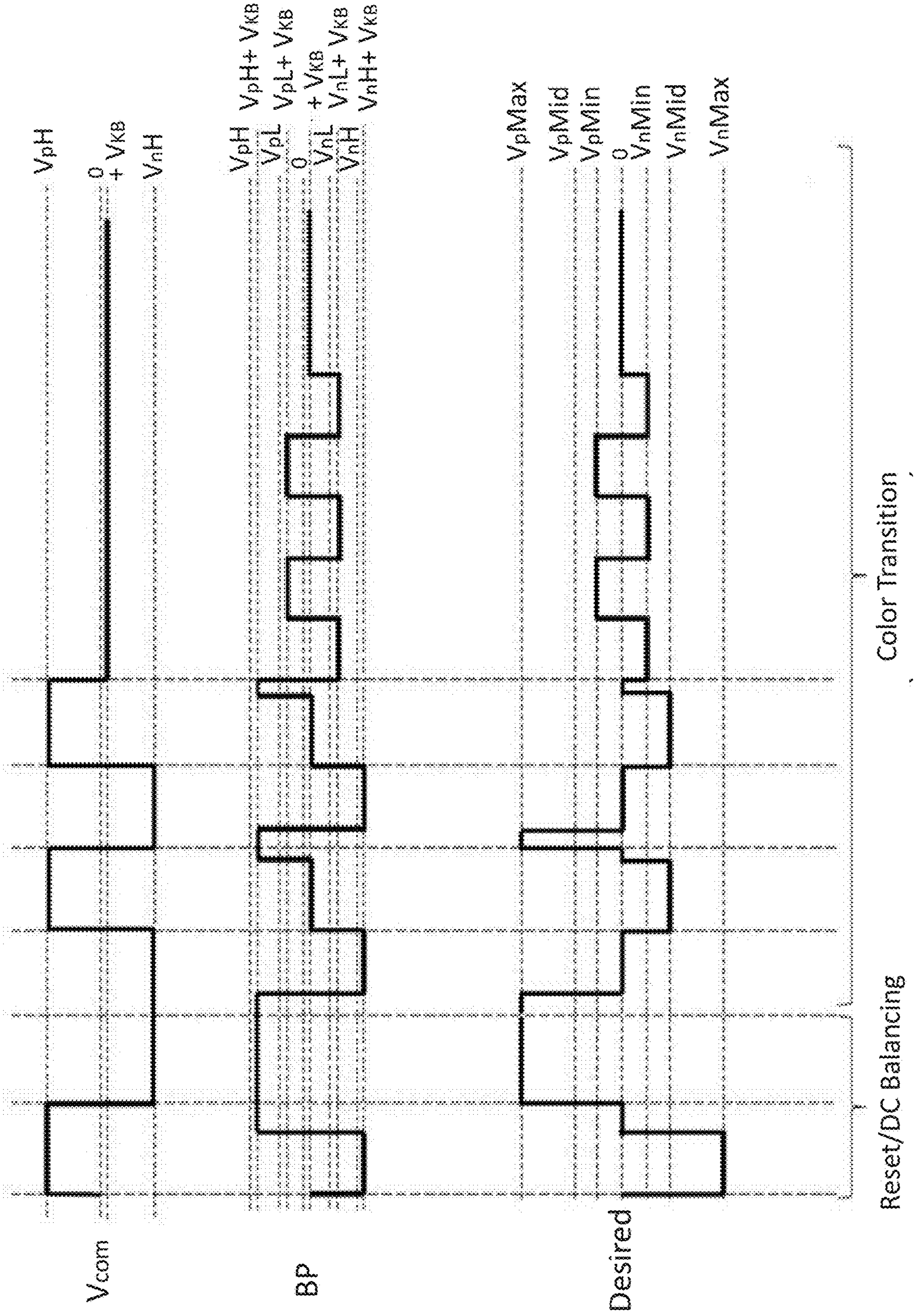
FIG. 6 is an exemplary waveform from the prior art including a two-part reset phase (A) and a color transition phase (B), which is achieved using top-plane switching.

In addition, the foregoing discussion of the waveforms, and specifically the discussion of DC balance, ignores the question of kickback voltage. In practice, as previously, every backplane voltage is offset from the voltage supplied by the power supply by an amounts equal to the kickback voltage $V_{KB}$. Thus, if the power supply used provides the three voltages +V, 0, and −V, the backplane would actually receive voltages V+$V_{KB}$, $V_{KB}$, and −V+$V_{KB}$(note that $V_{KB}$, in the case of amorphous silicon TFTs, is usually a negative number). The same power supply would, however, supply +V, 0, and −V to the front electrode without any kickback voltage offset. Therefore, for example, when the front electrode is supplied with −V the display would experience a maximum voltage of 2V+$V_{KB}$ and a minimum of $V_{KB}$. Instead of using a separate power supply to supply $V_{KB}$ to the front electrode, which can be costly and inconvenient, a waveform may be divided into sections where the front electrode is supplied with a positive voltage, a negative voltage, and $V_{KB}$. In addition to the kickback In commercial embodiments using amorphous silicon transistor control, seven different voltages can be applied to the pixel electrodes: three positive, three negative, and zero. Once the complications of top-plane switching, reset pulses, and DC Balancing are factored in, the resulting waveforms are rather complicated. For example, FIG. 6, which is taken from U.S. Pat. No. 10,593,272, depicts schematically one such waveform used to display a single color. As shown in FIG. 6, the waveforms for every color have the same basic form: i.e., the waveform is intrinsically DC-balanced and can comprise two sections or phases: (1) a preliminary series of frames that is used to provide a "reset" of the display to a state from which any color may reproducibly be obtained and during which a DC imbalance equal and opposite to the DC imbalance of the remainder of the waveform is provided, and (2) a series of frames that is particular to the color that is to be rendered; cf. Sections A and B of the waveform shown in FIG. 6.

During the first "reset" phase, the reset of the display ideally erases any memory of a previous state, including remnant voltages and pigment configurations specific to previously-displayed colors. Such an erasure is most effective when the display is addressed at the maximum possible voltage in the "reset/DC balancing" phase. In addition, sufficient frames may be allocated in this phase to allow for balancing of the most imbalanced color transitions. Because some colors require a positive DC-balance in the second section of the waveform and others a negative balance, in approximately half of the frames of the "reset/DC balancing" phase, the front electrode voltage $V_{com}$ is set to $V_{pH}$ (allowing for the maximum possible negative voltage between the backplane and the front electrode), and in the remainder, $V_{com}$ is set to $V_{nH}$ (allowing for the maximum possible positive voltage between the backplane and the front electrode). Empirically it has been found preferable to precede the $V_{com}$=$V_{nH}$ frames by the $V_{com}$=$V_{pH}$ frames.

The "desired" waveform (i.e., the actual voltage against time curve that is desired to apply across the electrophoretic medium) is illustrated at the bottom of FIG. 6, and its implementation with top plane switching is shown above, where the potentials applied to the front electrode ($V_{com}$) and to the backplane (BP) are illustrated. It is assumed that the column driver is used connected to a power supply capable of supplying the following voltages: $V_p$H, $V_{nH}$ (the highest positive and negative voltages, typically in the range of +10-15 V), $V_{pL}$, $V_{nL}$ (lower positive and negative voltages, typically in the range of ±1-10 V), and zero. In addition to these voltages, a kickback voltage $V_{KB}$ (a small value that is specific to the particular backplane used, measured as described, for example, in U.S. Pat. No. 7,034,783) can be supplied to the front electrode by an additional power supply. As shown in FIG. 6, every backplane voltage is offset by $V_{KB}$ (shown as a negative number) from the voltage supplied by the power supply while the front electrode voltages are not so offset, except when the front electrode is explicitly set to $V_{KB}$, as described above.

Based upon feedback from potential users, it has been determined that driving pulses (waveforms) such as shown in FIG. 6 are A) too long, and B) too flashy. ("Flashy" refers to an excessive number of end state pigment addresses, known as "dipoles", during an update. As the number of dipoles per update increases, a viewer is more likely to perceive that that the display is "flashing" even though there is no light emitted from the display.)

Simplified Top-Plane Switching

Figure 7:
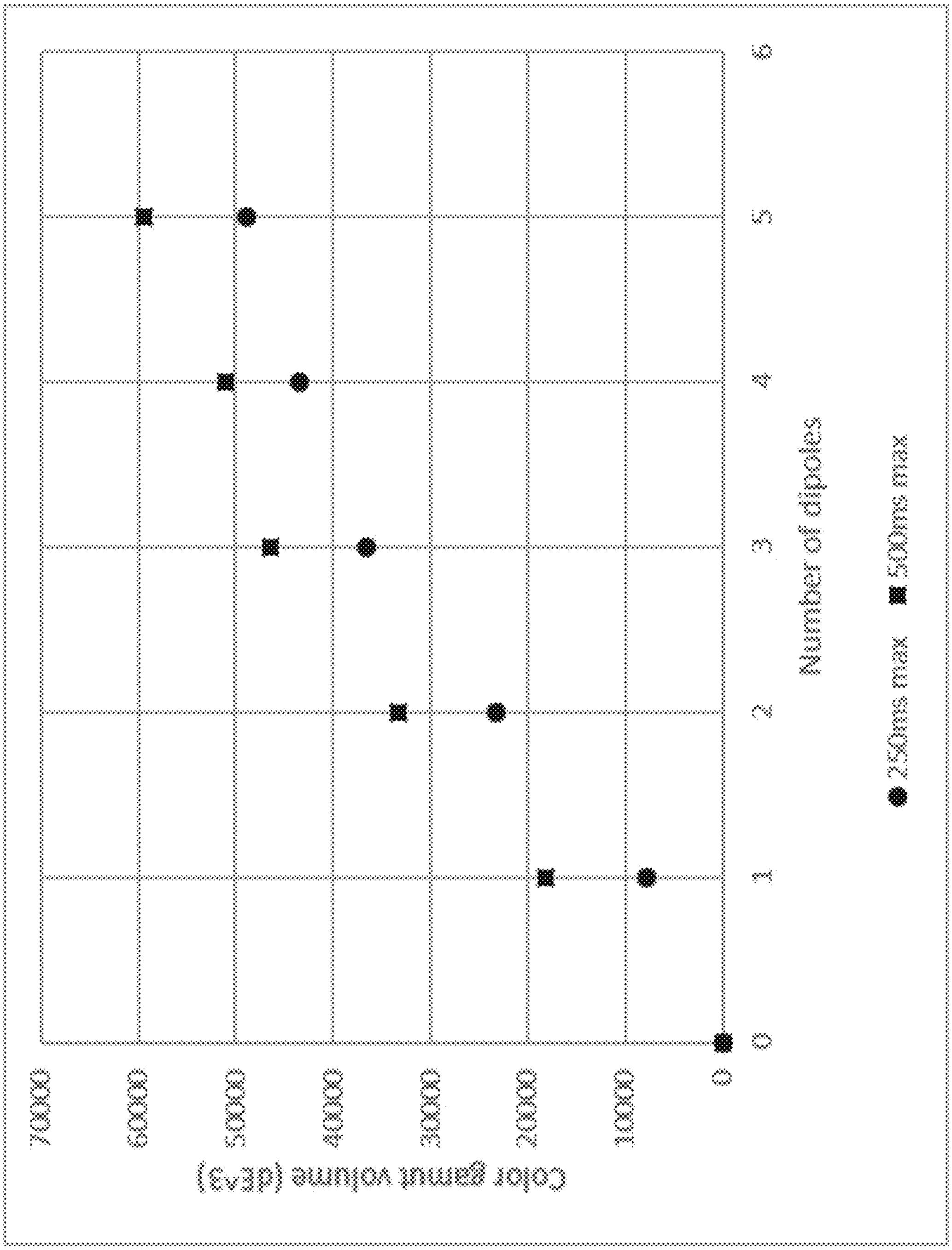
FIG. 7 depicts the correlation between available color gamut and the number of dipoles ("flashes") in an update of a four-particle full color electrophoretic display.

To reduce the length of time and flashiness of an update, the complexity of the front-plane switching can be reduced in exchange for a smaller number of available colors. (A calculation of the available color gamut as a function of the number of dipoles ("flashes") is presented in FIG. 7. Additionally, because the particles have a finite speed within the electrophoretic medium, the amount of time for which the dipole is applied also influences the size of the color gamut.

Figure 8:
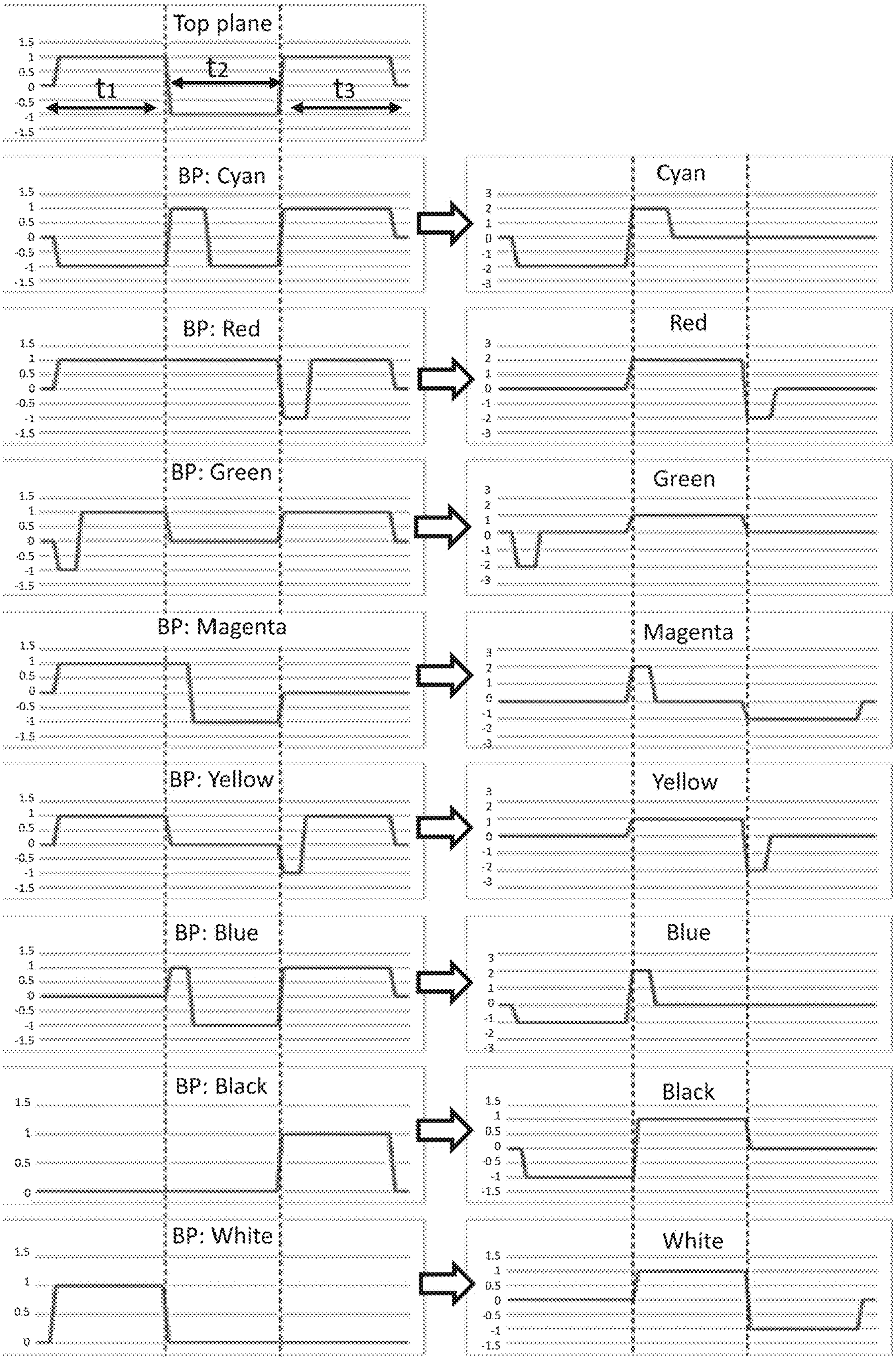
FIG. 8 depicts simplified top plane driving waveforms for the production of eight colors in an electrophoretic medium including three subtractive particles and a scattering (white) particle.

FIG. 8 shows such a solution in which a simplified top plane switching pulse sequence is used (top left panel), with simplified backplane pulse sequences (left; below) being matched to the single top-plane sequence, thereby providing at least distinct colors. The top plane is switched between two voltages, one positive and one negative, while the back plane can take three different voltages: positive, negative, and zero. (In FIG. 8, the voltage levels are relative, i.e., 1, 0, −1, but would in many instances actually be 15V, 0, and −15V as is typically with commercial backplanes including amorphous silicon thin film transistors.) Note that by subtracting the pulse sequence of the top-plane from the backplane pulse sequence (FIG. 8 left), the eight color sequences in FIG. 5 are achieved (FIG. 8 right). It is understood that for the pulse sequences in FIG. 5 and FIG. 8, the electrophoretic fluid includes a white pigment that is negatively charged, a magenta pigment and a cyan pigment that are positively charged, and the yellow pigment may be either positively or negatively charged, or essentially neutral. Other color/charge combinations are possible and the waveforms can be adujsted accordingly.

As discussed previously, in the waveforms of FIG. 8 at least five different voltages are required. In an active matrix driving environment, this may be achieved either (a) by supplying a choice of five different voltages to the columns when a particular row is selected at a particular time, or (b) by providing a choice of fewer (say, three) different voltages to the columns when a particular row is selected at a first time, and a different set of voltages when the same row is selected at a second time, or (c) by providing the same choice of three voltages to the columns at both the first and second times, but changing the potential of the front electrode between the first and second times. Option (c) is particularly helpful when at least one of the voltages required to be supplied is higher than the backplane electronics can support.

Because, with top plane switching, it is not possible to assert a high positive and a high negative potential simultaneously, it is necessary to offset the +/− dipoles of the top plane with respect to the −/+ dipoles of the backplane. In the waveform shown in FIG. 8, there is only one dipole per transition. This provides the least "flashy" waveform possible, since each dipole results in two visible optical changes to the display. In cases where five different voltage levels can be supplied to the backplane electrodes when each row is selected, and where the backplane electronics can support the highest voltages needed, it is not necessary to offset the dipoles in the manner shown in FIG. 8.

Driving with Modified Rail Voltages

For the drive sequences of FIG. 8, the voltages applied to the top plane are denoted $V_{t+}$ and $V_{t-}$, respectively, and those applied to the back plane $|V_{t+}|$ and $|V_{b-}|$, respectively, and $|V_{t+}|=|V_{t-}|V_{b+}|=|V_{b-}|=V$. Accordingly, when the maximum supply voltage is +/−15 volts, as is typical with commercial backplanes, the voltages across the electrophoretic medium become 30V, 28V, 0V, −28V, and −30V.

The maximum voltage magnitudes (i.e., "rail") of the top-plane electrode and the back-plane electrode need not be the same, however. For example, rail voltages offsets can be calculated from some nominal maximum voltage magnitude value, V. The offset for each rail may be denoted w, x, y and z, while it is assumed that the zero voltage rail is kept at zero and not applied to the top plane. (That is, the top plane is only high and low, while the backplane is high, low, and zero, as depicted in FIG. 8.) Thus:

$$V_{t+}=V+w$$

$$V_{t-}=-V+x$$

$$V_{b+}=V+y$$

$$V_{b-}=-V+z$$

$$V_{b0}=0$$

Referenced to the backplane voltage, three different negative voltages of high, medium and low magnitudes may be applied to the electrophoretic ink when the top plane is set to $V_{t+}$, denoted as $V_{H-}$, $V_{M-}$, and $V_{L-}$(i.e., $V_b-V_t$, where $V_b$ can take any of the three values shown above).

These voltages are:

$$V_{H-}=-2V+z-w$$

$$V_{M-}=-V-w$$

$$V_{L-}=y-w$$

The voltages available when the top plane is set to $V_{t-}$ are:

$$V_{H+}=2V+y-x$$

$$V_{M+}=V-x$$

$$V_{L+}=z-x$$

It is apparent that when w=x=y=z only the medium voltages $V_{M+}$ and $V_{M-}$ are affected by the offsets. Thus, it is possible to maintain the high voltage magnitudes as 2V, and the zero voltages as zero, while the medium voltages are each decreased by the amount of the offset (assumed to be positive). The difference between the two medium voltages will always be 2V.

Figure 9:
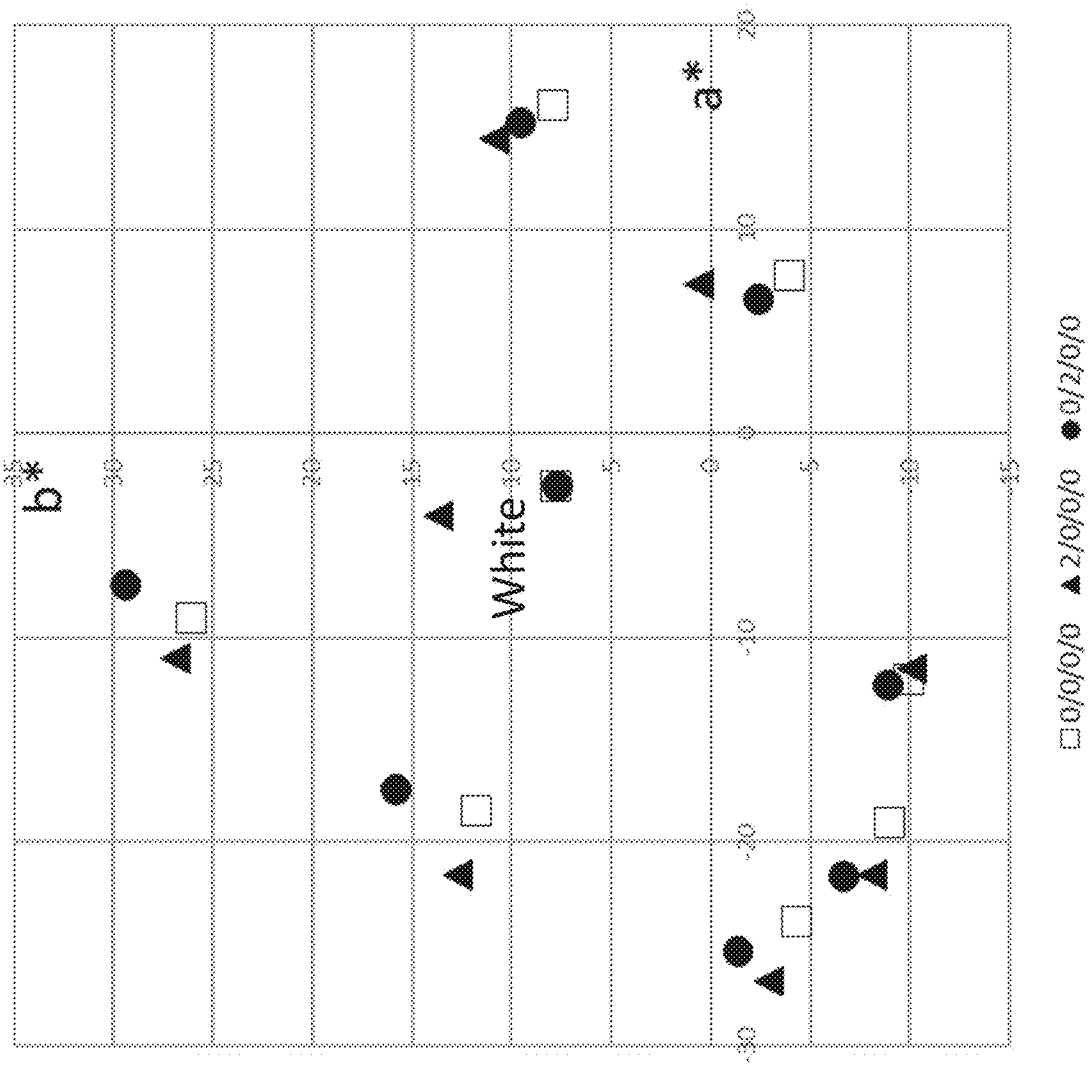
FIG. 9 shows the calculated effect of modifying the top plane voltage rails by +2V in an electrophoretic medium including three subtractive particles and a scattering (white) particle.

In, for example, a five-level driving system, if the top plane rail(s) are increased (or decreased) by some amount δ, i.e., w=δ or x=δ, while the backplane rails stay the same, the overall magnitude of some drive voltages will increase (or decrease), and the offset will create a new drive level as the $V_{L+}$ and $V_{L-}$ states are different. The effect of such a change can be calculated, when w=δ or x=δ and δ=+2V, and is shown graphically in FIG. 9. In FIG. 9, eight primary colors are shown to vary with modification of the driving voltages. In FIG. 9, the open square represents the "base," evenly-distributed, driving levels, the filled triangle represents an additional +2V of the highest driving level, while all other levels stay the same, and the filled circle represents an additional +2V for the intermediate top driving voltage, while all other states stay as in the base driving case. As can be seen from FIG. 9, modifying only individual top plane rails by +2V produces only minor effects. (Compare positions of open circles to closed triangles and closed circles.) The greatest change is seen in the white state (center of FIG. 9) when a positive offset is applied to the positive rail, in which case the b* is (undesirably) raised.

Figure 10:
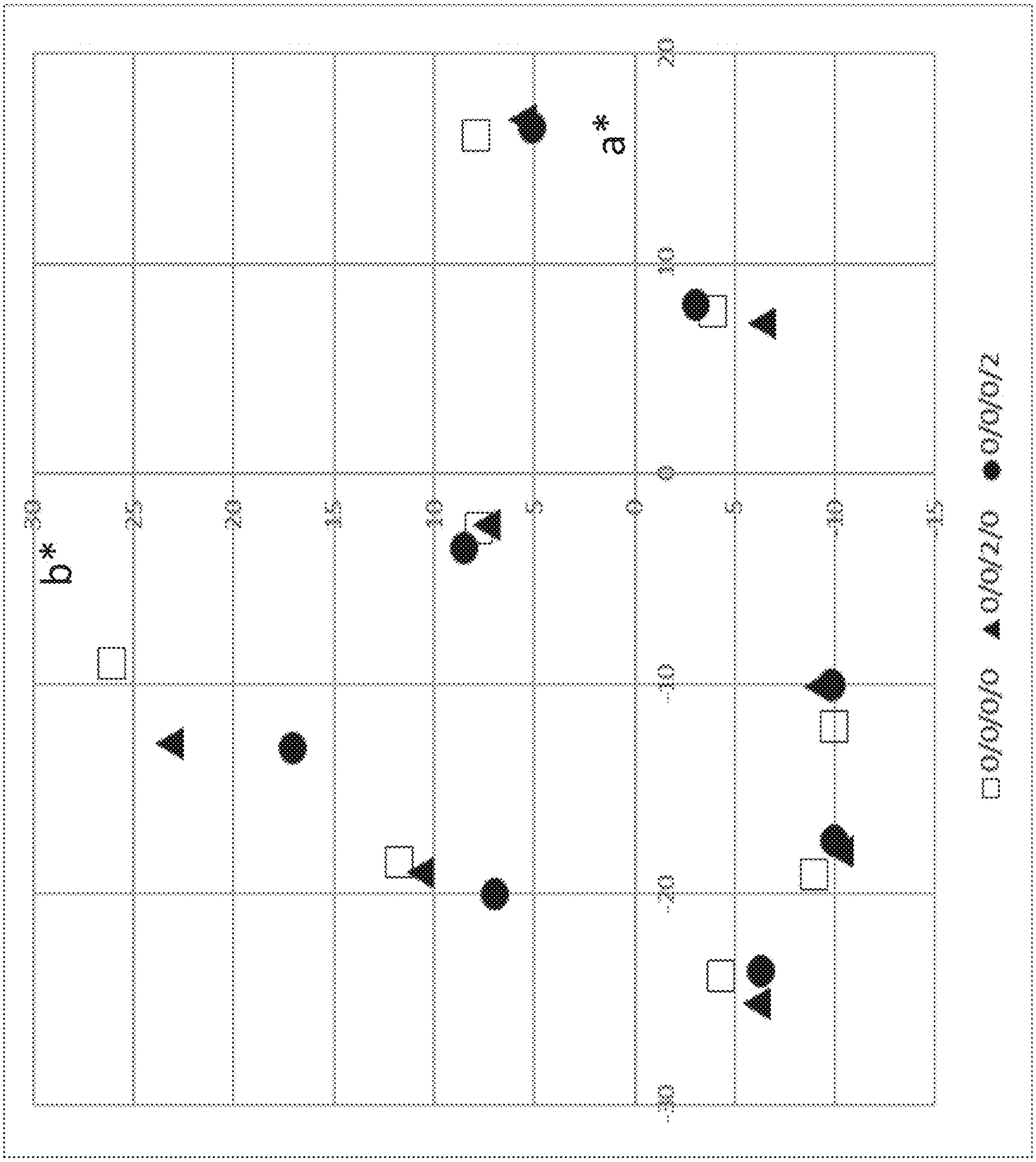
FIG. 10 shows the calculated effect of modifying the backplane voltage rails by +2V in an electrophoretic medium including three subtractive particles and a scattering (white) particle.

In a similar fashion, backplane rail(s) may be increased (or decreased) by some amount δ, i.e., y=δ or z=δ, while the top plane rails stay the same. The effect of a similar backplane rail adjustment of y=z=δ=+2V is shown in FIG. 10. In FIG. 10, eight primary colors are shown to vary with modification of the driving voltages. In FIG. 10, the open square represents the "base," evenly-distributed, driving levels, the filled triangle represents an additional +2V of the lowest driving level, while all other levels stay the same, and the filled circle represents an additional +2V for the intermediate lower driving voltage, while all other states stay as in the base driving case. While the change in the performance is not pronounced, when the positive or negative rail are modified by +2V the yellow color becomes increasingly green. This is typically undesirable as it causes, e.g., flesh tones to look green. However, in some digital signage applications, it may be preferred to trade yellow tones for stronger green tones.

Figure 11:
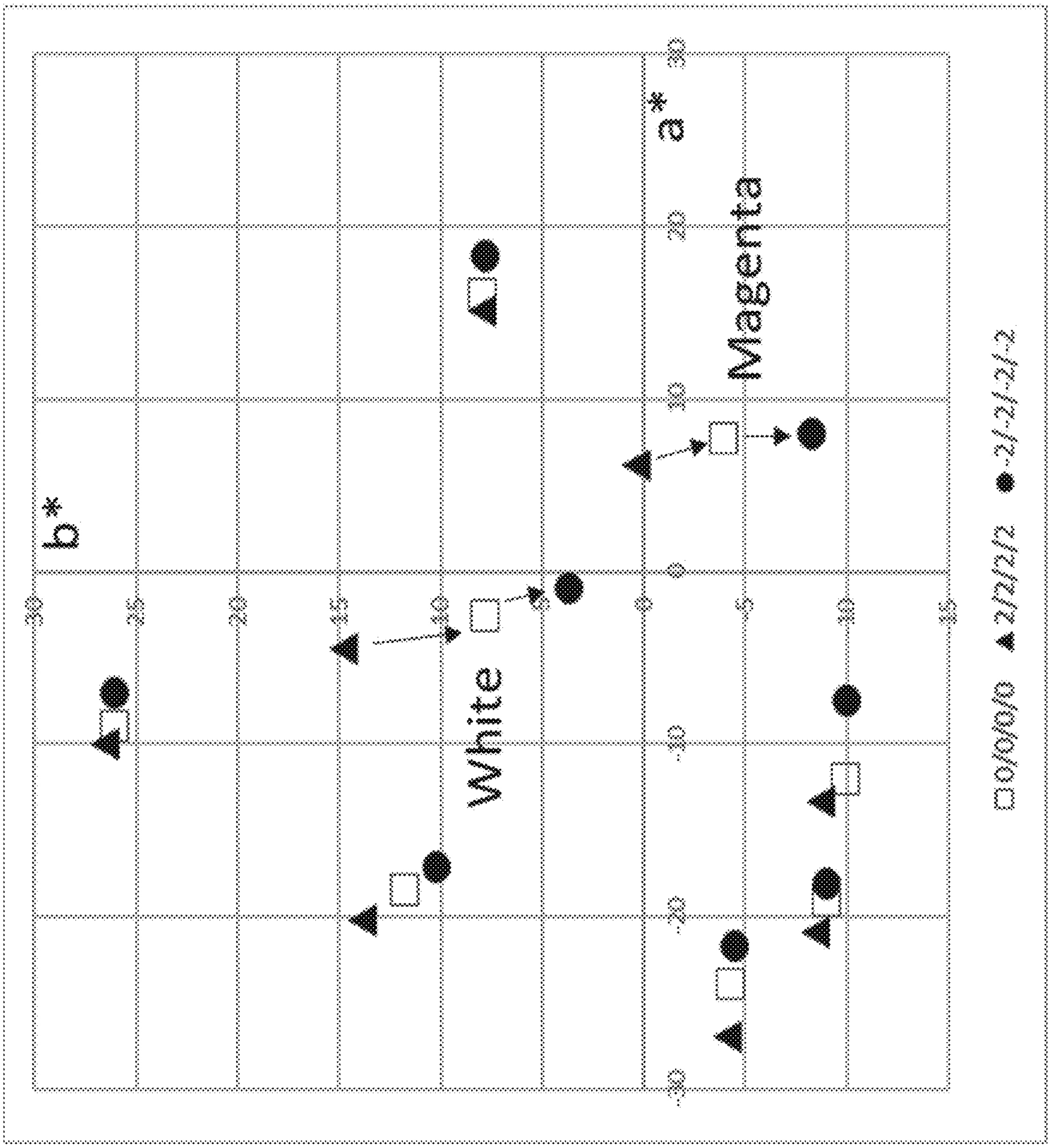
FIG. 11 shows the calculated effect of modifying both the top plane voltage rails and the backplane voltage rails by +2V and −2V in an electrophoretic medium including three subtractive particles and a scattering (white) particle.

Surprisingly, when the same offset δ=w=x=y=z is applied to all four rail voltages, more pronounced shifts in the electro-optic performance occur, thereby providing opportunities to adjust the color performance of the electrophoretic medium as may be required by the specific application. In FIG. 11, eight primary colors are shown to vary with modification of the driving voltages. In FIG. 11, the open square represents the "base," evenly-distributed, driving levels, the filled triangle represents an additional +2V for all driving levels, and the filled circle represents an additional −2V for all driving levels. In FIG. 11, the electro-optic performance has been calculated where δ is −2V, 0 and +2V, and the shift in electro-optic response is shown with arrows. It can be seen that some states (yellow, red, cyan) are only very slightly affected by the changes in offset, whereas the white and magenta states are very substantially shifted towards more negative b* as the offset is made more negative. As can be seen from the above equations, making the offset more negative makes $V_{M-}$ less negative and $V_{M+}$ more positive. The most important of these effects is the reduction of b* in the white state.

Thus, taken together, these results imply that the most useful adjustment is to apply the same offset to all four voltage rails. This results in an ability to change the mid-voltage ($V_M$) levels without affecting the high voltage magnitudes or the zero. Doing this allows the white state to be adjusted so as to be more neutral, especially in the b* dimension.

Higher Voltage Addressing with Metal Oxide Backplanes

While modifying the rail voltages provides some flexibility in achieving differing electro-optical performance from a four-particle electrophoretic system, there are many limitations introduced by top-plane switching. For example, it is typically preferred, in order to make a white state with displays of the present invention, that the lower negative voltage $V_{M-}$ is less than half the maximum negative voltage $V_{H-}$. As shown in the equations above, however, top-plane switching requires that the lower positive voltage is always at least half the maximum positive voltage, typically more than half.

An alternative solution to the complications of top-plane switching can be provided by fabricating the control transistors from less-common materials that have a higher electron mobility, thereby allowing the transistors to switch larger control voltages, for example +/−30V, directly. Newly-developed active matrix backplanes may include thin film transistors incorporating metal oxide materials, such as tungsten oxide, tin oxide, indium oxide, and zinc oxide. In these applications, a channel formation region is formed for each transistor using such metal oxide materials, allowing faster switching of higher voltages. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE.

One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver. Furthermore, a source driver capable of supplying at least five, and preferably seven levels provides a different driving paradigm for a four-particle electrophoretic display system. In an embodiment, there will be two positive voltages, two negative voltages, and zero volts. In another embodiment, there will be three positive voltages, three negative voltages, and zero volts. In an embodiment, there will be four positive voltages, four negative voltages, and zero volts. These levels may be chosen within the range of about −27V to +27V, without the limitations imposed by top plane switching as described above.

Using advanced backplanes, such as metal oxide backplanes, it is possible to directly address each pixel with a suitable push-pull waveform, i.e., as described in FIG. 5. This greatly reduces the time required to update each pixel, in some instances transforming a six-second update to less than one second. While, in some cases, it may be necessary to use reset pulses to establish a starting point for addressing, the reset can be done quicker at higher voltages. Additionally, in four-color electrophoretic displays having reduced color sets, it is possible to directly drive from a first color to a second color with a specific waveform that is only slightly longer than the push-pull waveforms shown in FIG. 5.

Thus, the invention provides for full color electrophoretic displays that are capable of directly addressing the electrophoretic medium without top plane switching, as well as waveforms for such electrophoretic displays. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A color electrophoretic display comprising:

a controller;

a light-transmissive electrode at a viewing surface;

a backplane electrode; and a color electrophoretic medium disposed between the light-transmissive electrode and the backplane electrode, the color electrophoretic medium comprising:

(a) a fluid;

(b) a plurality of first and a plurality of second particles dispersed in the fluid, the first and second particles bearing charges of opposite polarity, the first particle being a light-scattering particle and the second particle having one of the subtractive primary colors; and (c) a plurality of third and a plurality of fourth particles dispersed in the fluid, the third and fourth particles bearing charges of opposite polarity, the third and fourth particles each having a subtractive primary color different from each other and from the second particles, wherein the controller is configured to provide drive voltages including a first high voltage and a first low voltage to the light transmissive electrode, and drive voltages including a second high voltage, a zero voltage, and a second low voltage to the backplane electrode, such that the colors white, yellow, red, magenta, blue, cyan, green, and black can be displayed at the viewing surface, wherein the magnitudes of at least two of the first high voltage, the first low voltage, the second high voltage, and the second low voltage are not the same, and wherein the drive voltages provided to the light-transmissive electrode comprise one of the following:

the first high voltage for a first time, the first low voltage for a second time, and the first high voltage for a third time; or the first low voltage for a first time, the first high voltage for a second time, and the first low voltage for a third time.

2. The color electrophoretic display of claim 1, wherein the magnitude of the first high voltage and the magnitude of the second high voltage are the same.

3. The color electrophoretic display of claim 1, wherein the magnitude of the first low voltage and the magnitude of the second low voltage are the same, and the magnitude of the first high voltage and the magnitude of the second high voltage are not the same.

4. A method, comprising:

providing a color electrophoretic display comprising a controller; a light-transmissive electrode at a viewing surface; a backplane electrode; and a color electrophoretic medium disposed between the light-transmissive electrode and the backplane electrode, the color electrophoretic medium comprising: (a) a fluid; (b) a plurality of first and a plurality of second particles dispersed in the fluid, the first and second particles bearing charges of opposite polarity, the first particles being light-scattering particles and the second particles having one of the subtractive primary colors; and (c) a plurality of third and a plurality of fourth particles dispersed in the fluid, the third and fourth particles bearing charges of opposite polarity, the third and fourth particles each having a subtractive primary color different from each other and from the second particles; and applying drive voltages including a first high voltage and a first low voltage to the light transmissive electrode, and drive voltages including a second high voltage, a zero voltage, and a second low voltage to the backplane electrode, such that the colors white, yellow, red, magenta, blue, cyan, green, and black are displayed at the viewing surface, wherein the magnitudes of at least two of the first high voltage, the first low voltage, the second high voltage, and the second low voltage are not the same, and wherein the drive voltages provided to the light-transmissive electrode comprise one of the following:

the first high voltage for a first time, the first low voltage for a second time, and the first high voltage for a third time; or the first low voltage for a first time, the first high voltage for a second time, and the first low voltage for a third time.

5. The method of claim 4, wherein the magnitude of the first high voltage and the magnitude of the second high voltage are the same.

6. The method of claim 4, wherein the magnitude of the first low voltage and the magnitude of the second low voltage are the same, and the magnitude of the first high voltage and the magnitude of the second high voltage are not the same.

7. A color electrophoretic display comprising:

a controller;

a light-transmissive electrode at a viewing surface;

a backplane electrode; and a color electrophoretic medium disposed between the light-transmissive electrode and the backplane electrode, the color electrophoretic medium comprising:

(a) a fluid;

(b) a plurality of first and a plurality of second particles dispersed in the fluid, the first and second particles bearing charges of opposite polarity, the first particle being a light-scattering particle and the second particle having one of the subtractive primary colors;

(c) a plurality of third and a plurality of fourth particles dispersed in the fluid, the third and fourth particles bearing charges of opposite polarity, the third and fourth particles each having a subtractive primary color different from each other and from the second particles, wherein the controller is configured to cause the colors white, yellow, red, magenta, blue, cyan, green, and black color to be displayed at the viewing surface by providing one of a plurality of time dependent drive voltages to the backplane electrode while providing one of the following drive voltages to the light-transmissive electrode:

a high voltage for a first time, a low voltage for a second time, and a high voltage for a third time, or a low voltage for a first time, a high voltage for a second time, and a low voltage for a third time.

8. A method, comprising:

providing a color electrophoretic display comprising a controller; a light-transmissive electrode at a viewing surface; a backplane electrode; and a color electrophoretic medium disposed between the light-transmissive electrode and the backplane electrode, the color electrophoretic medium comprising (a) a fluid; (b) a plurality of first and a plurality of second particles dispersed in the fluid, the first and second particles bearing charges of opposite polarity, the first particle being a light-scattering particle and the second particle having one of the subtractive primary colors; and (c) a plurality of third and a plurality of fourth particles dispersed in the fluid, the third and fourth particles bearing charges of opposite polarity, the third and fourth particles each having a subtractive primary color different from each other and from the second particles; and causing the colors white, yellow, red, magenta, blue, cyan, green, and black color to be displayed at the viewing surface of the color electrophoretic display by applying one of a plurality of time dependent drive voltages to the backplane electrode while applying one of the following drive voltages to the light-transmissive electrode:

a high voltage for a first time, a low voltage for a second time, and a high voltage for a third time, or a low voltage for a first time, a high voltage for a second time, and a low voltage for a third time.

* * * * *